(12) United States Patent
Liao (10) Patent No.: US 7,395,608 B2
(45) Date of Patent: Jul. 8, 2008

(54) TAPE MEASURE

(76) Inventor: Huei-Yen Liao, 3f No. 15, Lane 13, Tung Sin Street, Nan Kong District, Taipei (TW)

( * ) Notice: Subject to any disclaimer, the term of this patent is extended or adjusted under 35 U.S.C. 154(b) by 0 days.

(21) Appl. No.: 11/457,267

(22) Filed: Jul. 13, 2006

(65) Prior Publication Data

US 2008/0010847 A1    Jan. 17, 2008

(51) Int. Cl.
*G01B 3/10* (2006.01)
(52) U.S. Cl. ........................................ 33/757
(58) Field of Classification Search ............ 33/757, 33/755
See application file for complete search history.

(56) References Cited

U.S. PATENT DOCUMENTS

| | | | |
|---|---|---|---|
| 4,429,462 A | 2/1984 | Rutty et al. | |
| 6,243,964 B1 * | 6/2001 | Murray | 33/769 |
| 6,324,769 B1 | 12/2001 | Murray | |
| 6,367,161 B1 * | 4/2002 | Murray et al. | 33/757 |
| 6,662,463 B2 * | 12/2003 | Lee | 33/757 |
| 6,907,676 B2 * | 6/2005 | Liao | 33/757 |
| 7,096,596 B2 * | 8/2006 | Hernandez et al. | 33/755 |
| 7,159,331 B2 * | 1/2007 | Critelli et al. | 33/755 |
| 7,174,654 B2 * | 2/2007 | Hernandez et al. | 33/755 |

* cited by examiner

*Primary Examiner*—Christopher W Fulton
(74) *Attorney, Agent, or Firm*—Alan Kamrath; Kamrath & Associates PA (57) ABSTRACT

A tape measure includes a reel, a tape that is wound on the reel and that can be reeled out, and a hook attached to a free end of the tape. The tape includes a concave-convex shape when it is reeled out. The concave-convex shape includes a height and a width and provides rigidity for the standout length. The tape includes a flat shape when it is wound on the reel. The flat shape includes a flattened width. The maximum standout length is not larger than 100 times of the flattened width or the flatness is not larger than one fourth of the flattened width. Thus, the tape can easily be wound and flattened on the reel and will not be deformed because of change in stress when it is retroflexed or wound.

31 Claims, 7 Drawing Sheets

TAPE MEASURE

BACKGROUND OF INVENTION

1. Field of Invention

The present invention relates to a tape measure and, more particularly, to a tape measure including a tape with maximum standout length for allowing smooth reeling in of the tape.

2. Related Prior Art

There are various tape measures. A tape measure includes a tape wound on a reel biased by a coil spring. The tape includes a concave-convex shape in a cross-sectional view taken along a line perpendicular to the length thereof. The concave-convex shape includes two lateral sections and a middle section extending between the lateral sections. The middle section includes a curvature radius while both of the lateral sections include a common curvature radius. Two concave-convex shapes are disclosed in U.S. Pat. No. 4,429,462. In the first concave-convex shape, the curvature radius of the middle section is identical to that of the lateral sections, i.e., the concave-convex shape includes a single section. In the second concave-convex shape, the curvature radius of the lateral sections is indefinite, i.e., the lateral sections are flat. Another concave-convex shape is disclosed in U.S. Pat. No. 6,324,769. In this concave-convex shape, the curvature radius of the middle section is not larger than that of the lateral sections while the curvature radius of the lateral sections is definite. Almost all of the tapes of the tape measures include these concave-convex shapes.

As known in the art, the shorter the curvature radii are (that is, the greater the curvatures are), the deeper the concave-convex shapes are, and the more rigid the tapes are, and the larger the standout length is, i.e., the longer the tapes extend before they collapse because of their own weight. However, the greater the curvatures are, the more difficult it is to flatten the tapes when they are reeled in. When the curvature reaches a certain point, the tapes could be damaged because the strength of the tapes could not stand the stress loaded in the tapes when they are flattened. This has been discussed in U.S. Pat. No. 4,429,462. A relation has been given between the blade width and standout length of a so-called commercially available tape as follows:

TABLE 1

| BLADE WIDTH, INCHES | STANDOUT LENGTH, INCHES |
| --- | --- |
| 1/4 | 12-16 |
| 1/2 | 35-43 |
| 3/4 | 55-73 |
| 1 | 86-97 |

As listed in TABLE 1, there should be a upper limit in the standout length for a given width of a tape.

Tapes that are more than 1 inch wide have gotten considerable attention, since wider tapes include larger standout length. That is, users can measure longer, wider and taller objects accurately without having to resort to other manners for retaining the tapes substantially straight along their length. Wide tapes are preferred also, because they can carry large numerals that can clearly be read.

The present invention is therefore intended to obviate or at least alleviate the problems encountered in the prior art.

SUMMARY OF INVENTION

According to a first aspect of the present invention, a tape measure includes a reel, a tape that is wound on the reel and that can be reeled out, and a hook attached to a free end of the tape. The tape includes a concave-convex shape when it is reeled out. The concave-convex shape comprises a height and a width and provides rigidity for the standout length. The tape includes a flat shape when it is wound on the reel. The flat shape includes a flattened width. The maximum standout length is not larger than 100 times of the flattened width so that the tape can easily be wound and flattened on the reel and will not be deformed because of change in stress when it is retroflexed or wound.

An advantage of the tape measure according to the first aspect of the present invention is that the maximum standout length can easily be predicated by multiplying the flattened width by 100.

According to the present invention, a tape measure includes a reel, a tape that is wound on the reel and that can be reeled out, and a hook attached to a free end of the tape. The tape includes a concave-convex shape when it is reeled out. The concave-convex shape comprises a height and a width and provides rigidity for the standout length. The tape includes a flat shape when it is wound on the reel. The flat shape includes a flattened width. The ratio of the height over the width of the concave-convex shape is not larger than one fourth of the flattened width so that the tape can easily be wound and flattened on the reel and will not be deformed because of change in stress when it is retroflexed and when it is wound.

An advantage of the tape measure according to the second aspect of the present invention is that the upper limit of practical flatness can be predicated by dividing the flattened width L by 4.

Other advantages and features of the present invention will become apparent from the following description referring to the drawings.

BRIEF DESCRIPTION OF DRAWINGS

The present invention will be described through detailed illustration of the preferred embodiment referring to the drawings.

FIG. 5 is another cross-sectional view of the tape of the tape measure shown in FIG. 1 when it is reeled in.

DETAILED DESCRIPTION OF PREFERRED EMBODIMENT

Figure 1:
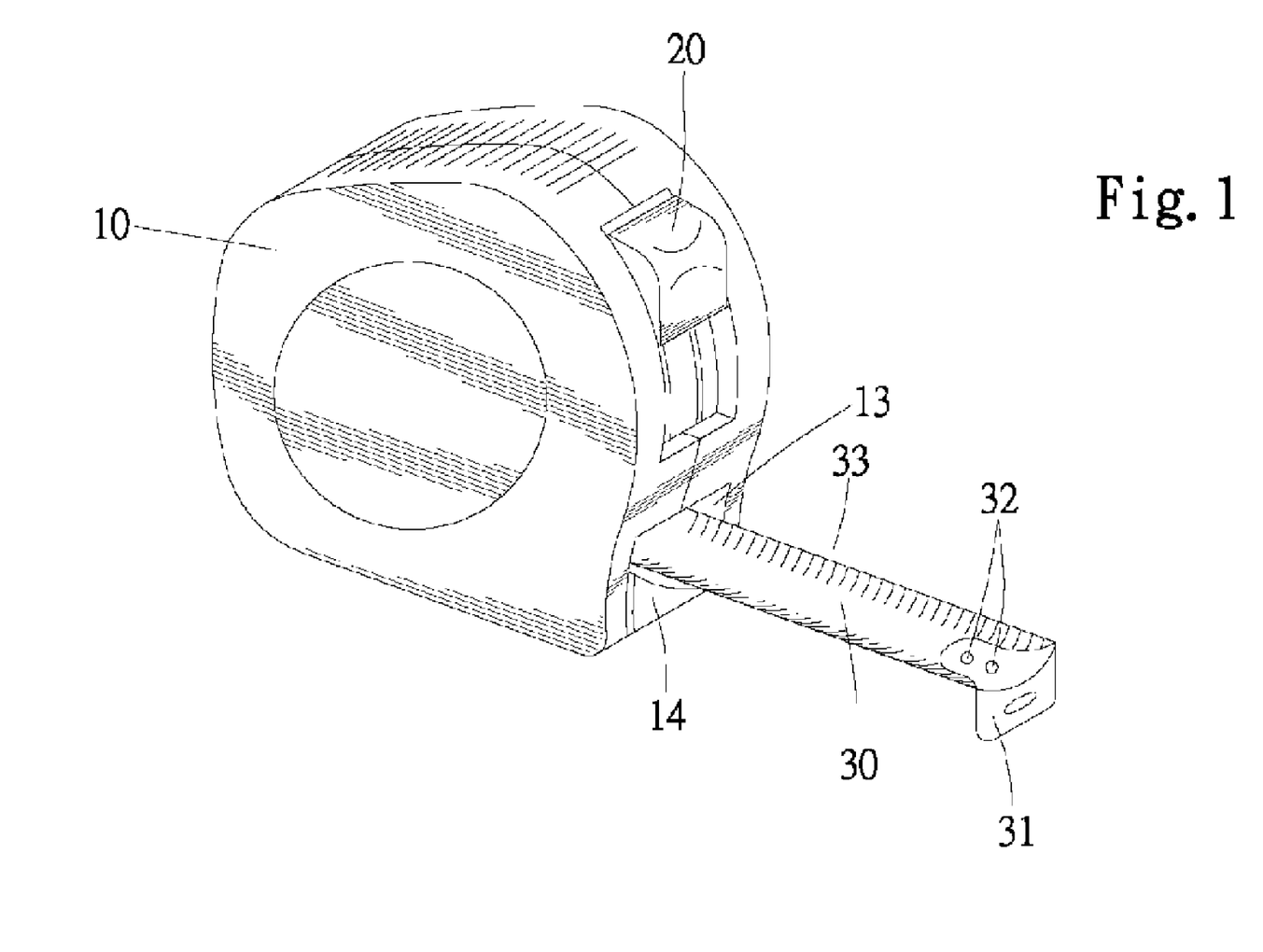
FIG. 1 is a perspective view of a tape measure according to the preferred embodiment of the present invention.
Figure 2:
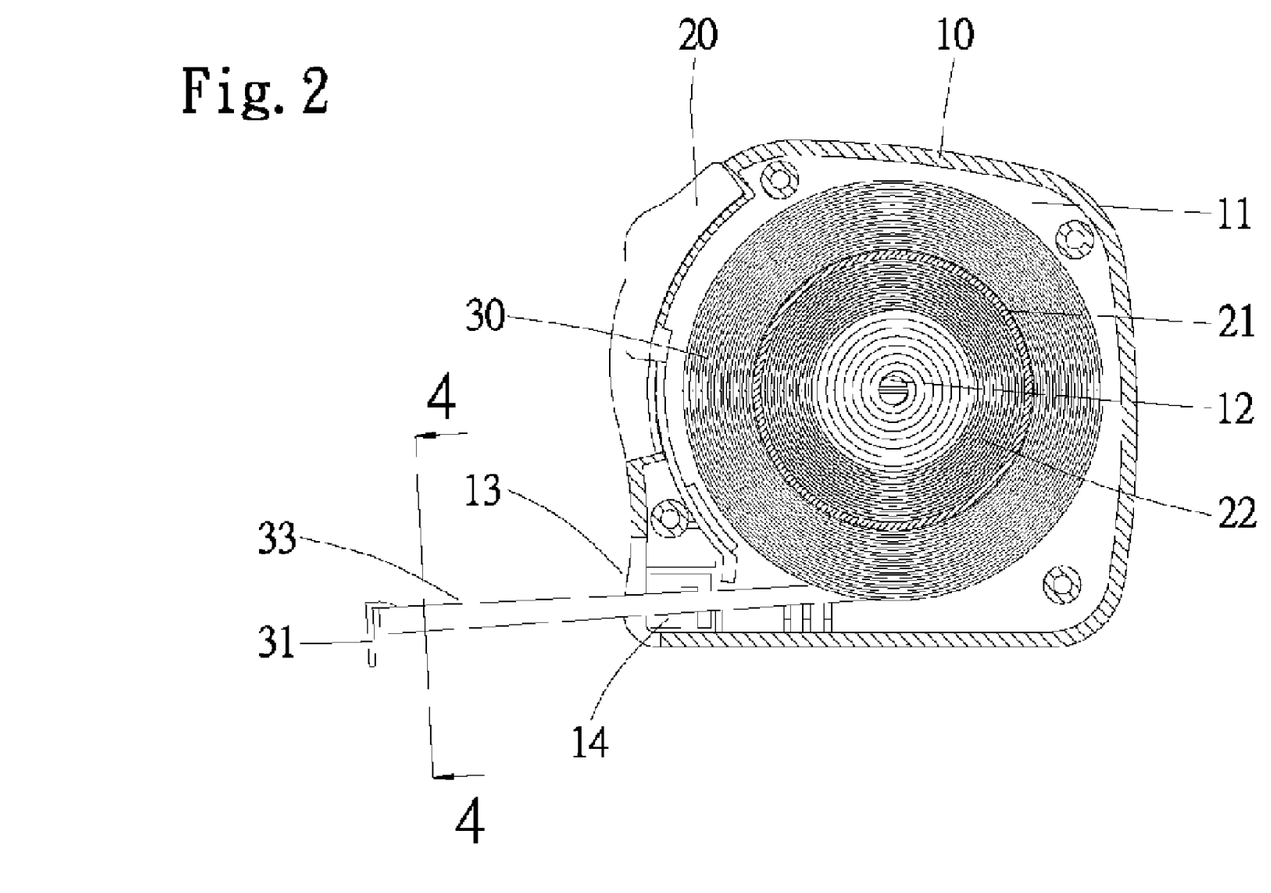
FIG. 2 is a cross-sectional view of the tape of the tape measure shown in FIG. 1.

Referring to FIGS. 1 and 2, there is shown a tape measure according to the preferred embodiment of the present invention. The tape measure includes a shell 10, a shaft 12 installed in the shell 10, a reel 21 installed on the shaft 12, a coil spring 22 arranged between the shaft 12 and the reel 21, a tape 30 wound on the reel 21, a hook 31 secured to a free end of the tape 30 by two rivets 32, a buffer 14 installed beneath the tape 30 and a brake 20 operable for retaining the tape 30.

The shell 10 defines a space 11 and an opening 13 in communication with the space 11. The space 11 receives the other elements. The free end of the tape 30 is exposed from the space 11 through the opening 13.

The coil spring 22 causes the reel 21 to reel in the tape 30.

The tape 30 carries a scale in centimeters and another in inches. The tape 30 is made of metal and includes a concave-convex shape 33 when it is reeled out. The tape 30 is however flattened when it is reeled in. The hook 31 is used to hook an external object.

The buffer 14 is used to buffer or reduce the friction on the tape 30. The buffer 14 may be made with a configuration to facilitate retaining of the tape 30 in the concave-convex shape 33.

Figure 3:
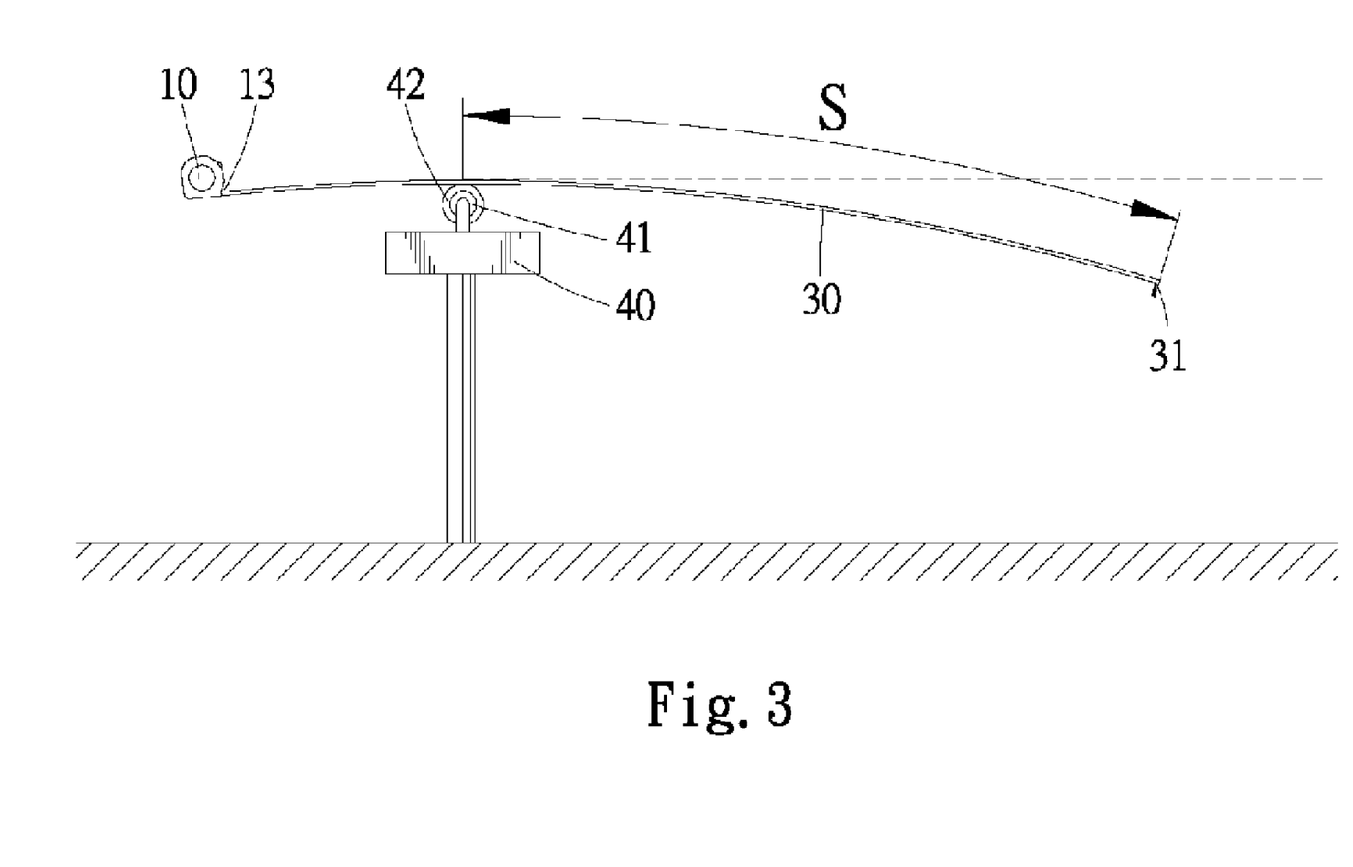
FIG. 3 is a side view of a mechanism for measuring the standout length of the tape measure shown in FIG. 1.

Referring to FIG. 3, there is shown a mechanism for measuring the standout length of the tape 30. The mechanism includes a platform 40, a shaft 41 on the platform 40 and a roller 42 on the shaft 41. The tape 30 is provided on the roller 42, with the shell 10 on one side of the roller 42 and the hook 31 on the other side. The tape 30 is moved on the roller 42 so that the section of the tape 30 between the hook 31 and the roller 42 gets longer. This section of the tape 30 bends more as it gets longer due to its own weight. When the length S of this section of the tape 30 reaches a certain value, this section of the tape 30 begins to collapse. This maximum value of the length S of this section of the tape 30 is called the "standout length $S_{max}$."

Figure 4:
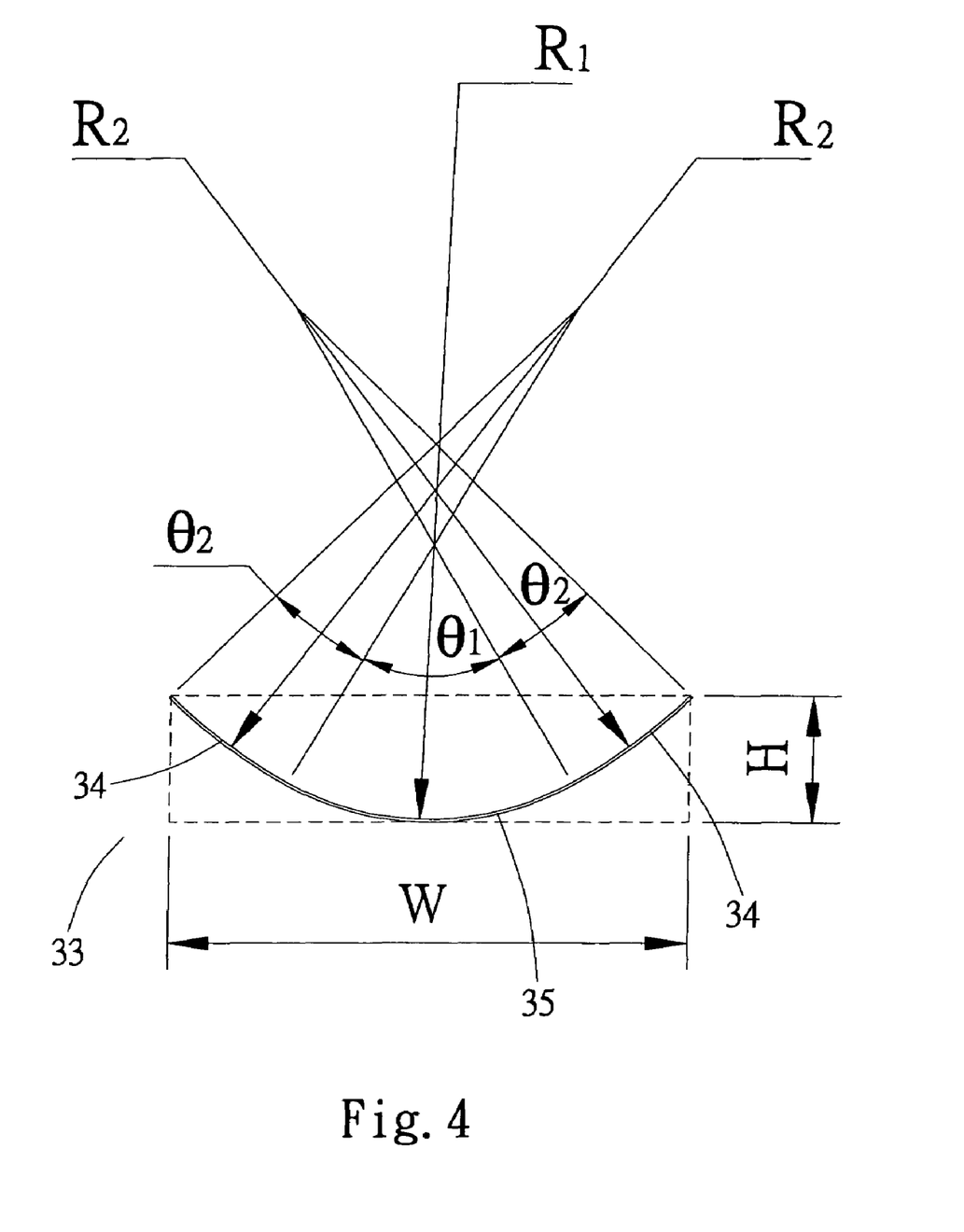
FIG. 4 is a cross-sectional view of the tape of the tape measure taken along a line 4-4 in FIG. 2.

Referring to FIG. 4, the concave-convex shape 33 of the tape 30 includes two lateral sections 34 and a middle section 35 extending between the lateral sections 34. The middle section 35 includes a curvature radius R1 and extends for an angle θ1. The lateral sections 34 include a common curvature radius R2 and extend for an angle θ2. The concave-convex shape 33 includes width W and height H.

Where the curvature radius R1 is equal to the curvature radius R2, the concave-convex shape 33 includes a single arched section. Where the curvature radius R1 is not larger than the curvature radius R2 that is definite, the concave-convex shape 33 includes three arched sections. Where the curvature radius R1 is not larger than the curvature radius R2 that is indefinite, the concave-convex shape 33 includes an arched middle section 35 and two flat lateral sections 34. The curvature radius R1 should not be greater than the curvature radius R2. Otherwise, the standout length $S_{max}$ would be too small or the tape 30 could not be flattened when it is reeled in.

Figure 5:
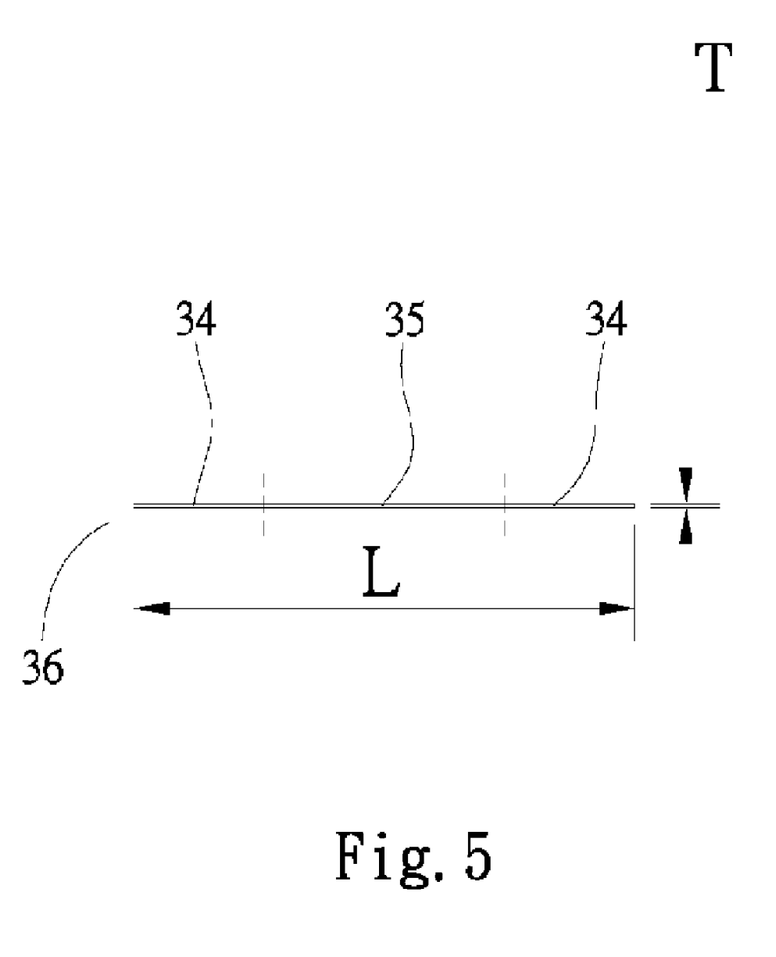

Referring to FIG. 5, the tape 30 is flattened and given a flat shape 36 when it is reeled in, i.e., wound on the reel 21. The flat shape 36 of the tape 30 includes width L and thickness T.

The present invention is intended to set upper limits for the standout length $S_{max}$ of steel tapes that are 1 inch wide or wider. Tests have been run on tapes with width of 1 inch and standout length $S_{max}$ of 95, 100 and 105 inches, respectively. The standout length $S_{max}$ of 95 inches is common. For the tape with the standout length $S_{max}$ of 95 inches, the flattening of the tape is easy and only requires proper spring torque. For the tape with the standout length $S_{max}$ of 100 inches, resistance against the flattening of the tape is increased and stronger spring torque is required to wind the tape on the reel 21. For the tape with the standout Length $S_{max}$ of 105 inches, the curvature of the concave-convex shape 33 is the largest, and the concave-convex shape 33 could be deformed and damaged for sudden change in stress when the tape is retroflexed. Moreover, it requires a larger force to turn the tape from the concave-convex shape 33 to the flat shape 36. As a result, the tape is not quite flattened when it is wound on the reel 21. For a tape longer than 25 feet, the tape tends to rattle violently during the winding thereof onto the reel 21. To reduce this effect, it requires much stronger spring torque; however, there is no guarantee of complete flattening of the tape. A conclusion is drawn that for a tape with width of 1 inch and standout length $S_{max}$ longer than 100 inches, inadequate flattening happens, or large spring torque is required to overcome the inadequate flattening. Such standout length $S_{max}$ is impractical and not economic.

Tests have been run on tapes with width of 1.25 inches and standout length $S_{max}$ of 120, 125 and 130 inches, respectively. Similarly, the tape with smaller standout length $S_{max}$ requires weaker spring torque. For the tape with the standout length $S_{max}$ of 120 inches, the flattening of the tape is easy. For the tape with the standout length $S_{max}$ of 125 inches, stronger spring torque is required to smoothly wind the tape on the reel 21. For the tape with the standout length $S_{max}$ of 130 inches, complete flattening of the tape is not guaranteed when it is reeled in although quite strong spring torque is provided. The concave-convex shape of the tape could be damaged when it is retroflexed. A conclusion is drawn that for a tape with width of 1.25 inches, the standout length $S_{max}$ should not exceed 125 inches. Otherwise, the tape would be vulnerable to damage when it is retroflexed, and the tape could not easily be reeled in.

As learned from the above-discussed examples, the standout length $S_{max}$ should not be larger than 100 inches for the tape with the width of 1 inch, and the standout length $S_{max}$ should not be larger than 125 inches for the tape with the width of 1.25 inches. Thus, the practicality and economics of the tapes are ensured. Conclusively, the maximum standout length $S_{max}$ of a tape is about 100 times as large as the width of the tape.

The relation between the maximum standout length $S_{max}$ and width L of a tape can be expressed in an equation as follows:

$$S_{max} = 100L$$

The standout of the tape 30 is influenced by many factors such as the concave-convex shape 33 of the tape 30, the hardness and thickness of the tape 30 and the weight of the hook 31 at the free end of the tape 30. The concave-convex shape 33 of the tape 30 is the most important among these factors. As known, the larger the curvature of the tape 30 is, the larger the standout length $S_{max}$ of the tape 30 is. A simple geometric parameter is provided to calculate the standout length $S_{max}$ of the tape 30 and draw the concave-convex shape 33 of the tape 30. Hence, the time and money spent on design and development can be reduced, and practicality and economics are reached.

There is proposed a concept of flatness α. Referring to FIG. 4, the flatness α of the tape 30 is defined to be the ratio of the height H of the concave-convex shape 33 over the width W. The relation between the flatness α, height H and width W can be expressed in an equation as follows:

$$\alpha = H/W$$

The smaller the flatness α is, the closer the concave-convex shape 33 is to flat, the smaller the rigidity against the flattening is, and the smaller the standout length $S_{max}$ is. The larger the flatness α is, the larger the curvature of the concave-convex shape 33 is, the larger the rigidity against the flattening is, and the larger the standout length $S_{max}$ is.

The easiest way to understand the relation between the flatness α and the standout length $S_{max}$ is measuring. Tests have been run on tapes with various flattened width L and thickness T and various height H and width W of the concave-convex shapes. The standout length $S_{max}$ of these tapes has been measured. The flatness α of the tapes has been calculated. The results are listed as follows:

TABLE 2

| No. | L | T | H | W | $S_{max}$ | α | $S_{max}/α$ |
|---|---|---|---|---|---|---|---|
| 1 | 1.000 | 0.0058 | 0.2126 | 0.8740 | 98 | 0.2432 | 403.0 |
| 2 | 1.080 | 0.0060 | 0.2402 | 0.9606 | 100 | 0.2501 | 399.8 |
| 3 | 1.250 | 0.0059 | 0.3110 | 1.0551 | 117 | 0.2948 | 396.9 |
| 4 | 1.625 | 0.0059 | 0.3563 | 1.4252 | 100 | 0.2500 | 400.0 |
| 5 | 1.625 | 0.0061 | 0.4016 | 1.3425 | 120 | 0.2991 | 401.2 |
| 6 | 1.250 | 0.0065 | 0.4016 | 0.8228 | 195 | 0.4881 | 399.5 |
| 7 | 1.625 | 0.0063 | 0.5079 | 1.0591 | 193 | 0.4796 | 402.4 |

The first to fifth examples are related to tapes of the present invention wherein the standout length $S_{max}$ is practical. The sixth and seventh examples are related to single-sectioned concave-convex shapes that are designed for tests and deformed during the tests. Attempts to wind the sixth and seventh examples on the reel 21 are not successful because they include curvature that is too large and cannot be flattened. The ratio of the standout length $S_{max}$ over the flatness α is about 400. The relation between the standout length $S_{max}$ and the flatness α can be expressed in an equation as follows:

$$S_{max} = 400α$$

There is error in every empirical equation. There is error in the equation that the ratio $S_{max}/α$ of the standout length $S_{max}$ over the flatness α is about 400. The error is attributed to three factors. The first factor is the weight of the hook 31. The more the hook 31 weighs, the smaller the standout length $S_{max}$ is. The less the hook 31 weighs, the larger the standout length $S_{max}$ is. The second factor is the thickness T of the tapes. The common thickness of modern tapes is about 0.0050 inch to 0.0070 inch. The thickness T of the tapes of the present invention is 0.0055 inch to 0.0065 inch. Basically, the thicker the tapes are, the better the tapes assume the concave-convex shape, and the larger the standout length $S_{max}$ is. The third factor is the hardness of the tapes. Harder tapes provide better rigidity and larger standout length $S_{max}$. In fact, according to the experience of the applicant of the present application, the error is within 10%. Hence, the ratio $S_{max}/α$ that is about 400 is valuable. By applying this ratio, the standout length $S_{max}$ can be predicted.

Figure 6:
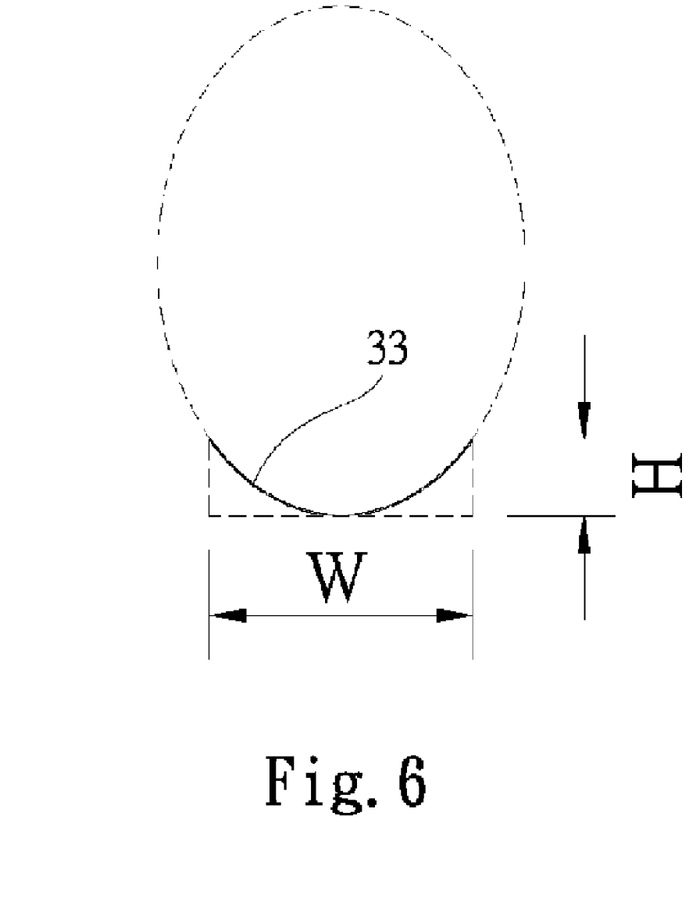
FIG. 6 shows that the tape of the tape measure shown in FIG. 1 is made based on a section of an ellipse.
Figure 7:
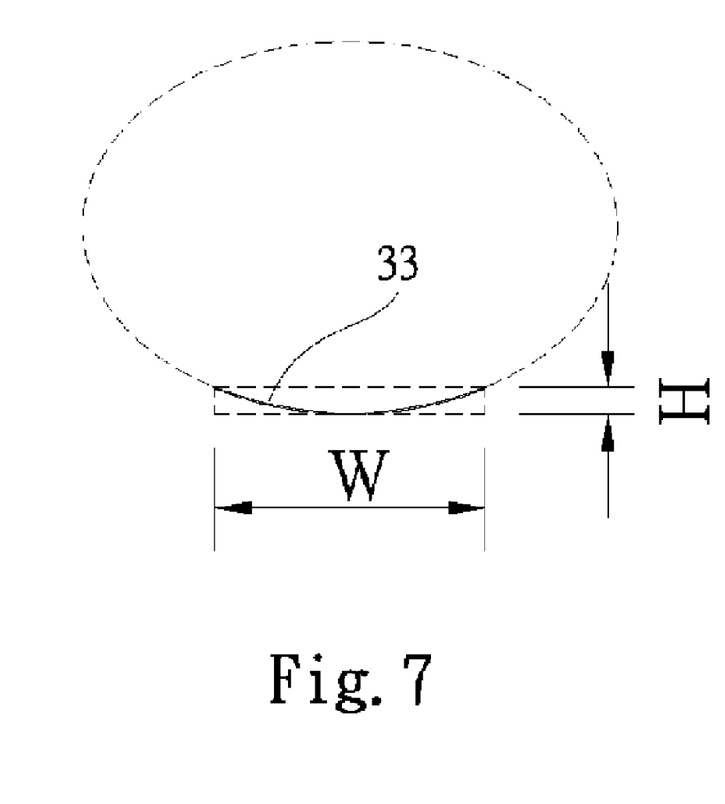
FIG. 7 shows that the tape of the tape measure shown in FIG. 1 is made based on another section of the ellipse shown in FIG. 6.

Other concave-convex shapes of the tape 30 will be discussed. The concave-convex shape 33 shown in FIG. 4 includes the arched middle section 35 and the arched or flat lateral sections 34 because arches and straight lines are fundamental geometric elements and can easily be fabricated. However, many continuous curves can be used. Circles are quadratic curves. Other quadratic curves such as ellipses, parabolas and hyperbolas can be used. Referring to FIGS. 6 and 7, an ellipse is used to draw convex-concave shapes. Referring to FIG. 6, the curvature radii get larger from the center to the sides. Referring to FIG. 7, the curvature radii get smaller from the center to the sides. The concave-convex shape shown in FIG. 6 is apparently more practical than that shown in FIG. 7. The point is that using these quadratic curves or other continuous differential curves, after simple measurement and calculation of the flatness α; the standout length $S_{max}$ can easily be predicted.

Figure 8:
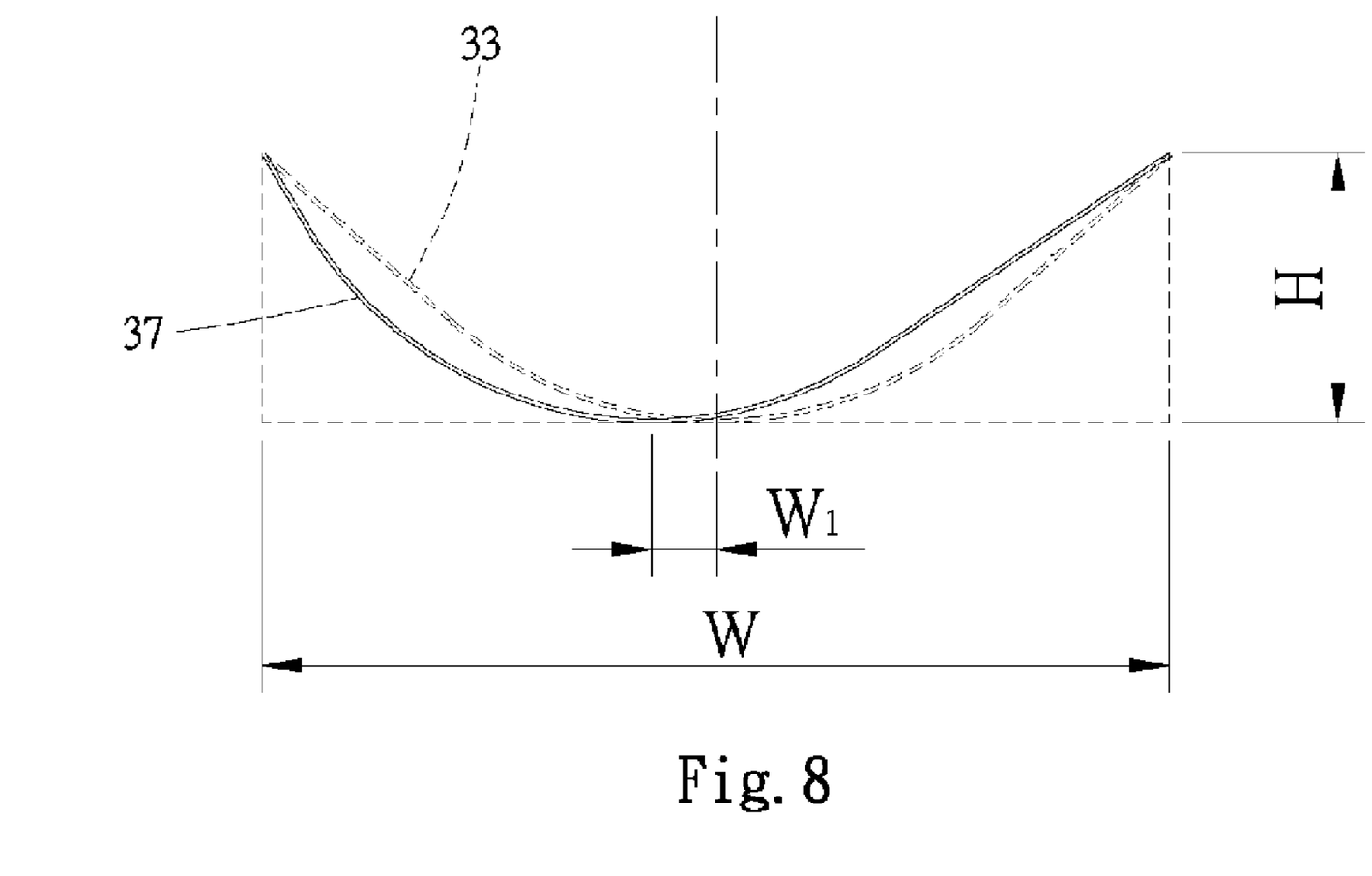
FIG. 8 is cross-sectional view of the tape of the tape measure shown in FIG. 1 when it is deformed.

Another phenomenon will be discussed. As discussed above, the concave-convex shapes are symmetrical. However, as the tapes are very thin, the curvature of the concave-convex shapes is easily changed during the fabrication. That is, arches might not be real arches and straight lines could be bent. Referring to FIG. 8, the concave-convex shapes are expected to be symmetrical but might be deformed. An error between the center of a deformed concave-convex shape 37 and the center of the ideal concave-convex shape 33 is assumed to be W1. If the error W1 is too big, the tape 30 rattles violently during the winding of the tape 30 onto the reel 21, and this makes the winding difficult. Basically, the ratio W1/W of the error W1 over the width W should be not larger than 0.2. Otherwise, there would be difficulty in the winding. In practice, the flatness α will not be affected by the error W1. Therefore, the standout length $S_{max}$ can still be predicted by multiplying the flatness α by 400.

Conclusively, the concept of maximum standout length $S_{max}$ has been proposed for tapes with different flattened width L. The maximum standout length $S_{max}$ is 100 times as large as the flattened width L. In addition, the flatness α is used to represent the curvature of the concave-convex shape, and the standout length $S_{max}$ is about 400 times as large as the flatness α. In other words, there is a relation between the maximum standout length $S_{max}$ and the practical flatness α. There is derived a relation between the practical flatness α and the flattened width L that the practical flatness α is about one fourth of the flattened width L. Tests have been run on tapes with width of at least 1 inch regarding this relation. The results of these tests are listed as follows:

TABLE 3

| L (INCHES) | $S_{max}$ (INCHES) | α |
|---|---|---|
| 1 | 100.0 | 1/4 |
| 1 1/8 | 112.5 | 9/32 |
| 1 1/4 | 125.0 | 5/16 |
| 1 3/8 | 137.5 | 11/32 |
| 1 1/2 | 150.0 | 3/8 |
| 1 5/8 | 162.5 | 13/32 |
| 1 3/4 | 175.0 | 7/16 |
| 1 7/8 | 187.5 | 15/32 |
| 2 | 200.0 | 1/2 |

The tape measure of the present invention exhibits several advantages. Firstly, the maximum standout length $S_{max}$ can be predicated by multiplying the flattened width L by 100. Within the maximum standout length $S_{max}$, the tape does not collapse. Secondly, the practical flatness α can be predicated by dividing the flattened width L by 4. Within the practical flatness α, the tape can easily be wound and flattened on the reel 21 without deformation. Thirdly, the design and development of tapes are fast and economic.

The present invention has been described through the illustration of the preferred embodiment. Those skilled in the art can derive variations from the preferred embodiment without departing from the scope of the present invention. Therefore, the preferred embodiment shall not limit the scope of the present invention defined in the claims.

What is claimed is:

1. A tape measure comprising a reel, a tape that is wound on the reel and can be reeled out, a hook attached to a free end of the tape, the tape comprising a concave-convex shape when it is reeled out, the concave-convex shape comprises a height and a width, and provides rigidity for the standout length, the tape comprising a flat shape when it is wound on the reel, the flat shape comprising a flattened width of 1 inch or larger, wherein the ratio of the height over width of the concave-convex shape is not larger than one fourth of the flattened width, and wherein the standout length is not larger than 100 times of the flattened width and within an error of 10%, wherein the tape can easily be wound and flattened on the reel, and will not be deformed because of change in stress when it is retroflexed and when it is wound.

2. The tape measure according to claim 1 wherein the flattened width is 1⅛ inches, and the maximum standout length is not longer than 112.5 inches.

3. The tape measure according to claim 1 wherein the flattened width is 1¼ inches, and the maximum standout length is not longer than 125 inches.

4. The tape measure according to claim 1 wherein the flattened width is 1⅜ inches, and the maximum standout length is not longer than 137.5 inches.

5. The tape measure according to claim 1 wherein the flattened width is 1½ inches, and the maximum standout length is not longer than 150 inches.

6. The tape measure according to claim 1 wherein the flattened width is 1⅝ inches, and the maximum standout length is not longer than 162.5 inches.

7. The tape measure according to claim 1 wherein the flattened width is 1¾ inches, and the maximum standout length is not longer than 175 inches.

8. The tape measure according to claim 1 wherein the flattened width is 1⅞ inches, and the maximum standout length is not longer than 187.5 inches.

9. The tape measure according to claim 1 wherein the flattened width is 2 inches, and the maximum standout length is not longer than 200 inches.

10. A tape measure comprising a reel, a tape that is wound on the reel and can be reeled out, a hook attached to a free end of the tape, the tape comprising a concave-convex shape when it is reeled out, the concave-convex shape comprises a height and a width, and provides rigidity for the standout length, the tape comprising a flat shape when it is wound on the reel, the flat shape comprising a flattened width, wherein the ratio of the height over width of the concave-convex shape is not larger than one fourth of the flattened width so that the tape can easily be wound and flattened on the reel, and will not be deformed because of change in stress when it is retroflexed and when it is wound, and wherein the deformed concave-convex shape has an error between a center thereof and a center of the concave-convex shape not larger than 0.2 times of the width of the concave-convex shape.

11. The tape measure according to claim 10, wherein the flattened width is 1⅛ inches, and the ratio is not larger than 9/32.

12. The tape measure according to claim 10 wherein the flattened width is 1¼ inches, and the ratio is not larger than 5/16.

13. The tape measure according to claim 10 wherein the flattened width is 1⅜ inches, and the ratio is not longer than 11/32.

14. The tape measure according to claim 10 wherein the flattened width is 1½ inches, and the ratio is not longer than ⅜.

15. The tape measure according to claim 10 wherein the flattened width is 1⅝ inches, and the ratio is not longer than 13/32.

16. The tape measure according to claim 10 wherein the flattened width is 1¾ inches, and the ratio is not longer than 7/16.

17. The tape measure according to claim 10 wherein the flattened width is 1⅞ inches, and the ratio is not longer than 15/32.

18. The tape measure according to claim 10 wherein the flattened width is 2 inches, and the ratio is not longer than ½.

19. The tape measure according to claim 10 wherein the concave-convex shape comprises a single section.

20. The tape measure according to claim 10 wherein the concave-convex shape comprises a section of a parabola.

21. The tape measure according to claim 20 wherein the parabola is a circle.

22. The tape measure according to claim 20 wherein the parabola is an ellipse.

23. The tape measure according to claim 10 wherein the concave-convex shape comprises two lateral sections and a middle section extending between the lateral sections.

24. The tape measure according to claim 23 wherein the middle section is a section of a parabola.

25. The tape measure according to claim 24 wherein the parabola is a circle.

26. The tape measure according to claim 24 wherein the parabola is an ellipse.

27. The tape measure according to claim 23 wherein the lateral sections are identical.

28. The tape measure according to claim 23 wherein both of the lateral sections are flat.

29. The tape measure according to claim 23 wherein each of the lateral sections is a section of a parabola.

30. The tape measure according to claim 29 wherein the parabola is a circle.

31. The tape measure according to claim 29 wherein the parabola is an ellipse.

* * * * *